Jan. 18, 1955
F. H. APPEL ET AL
CONTAINER AND DISPENSING MEANS
FOR A PRESSURIZED FOOD PRODUCT
2,699,890
Filed July 5, 1949
2 Sheets-Sheet 1
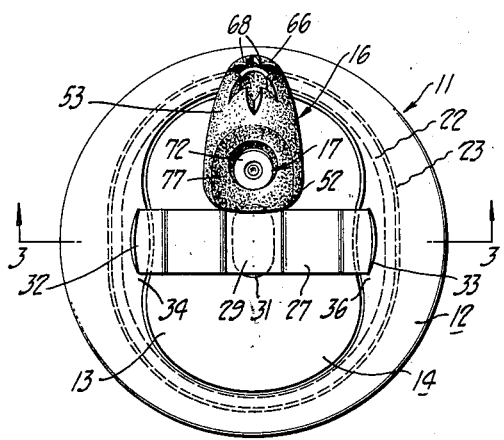
FIG_2_
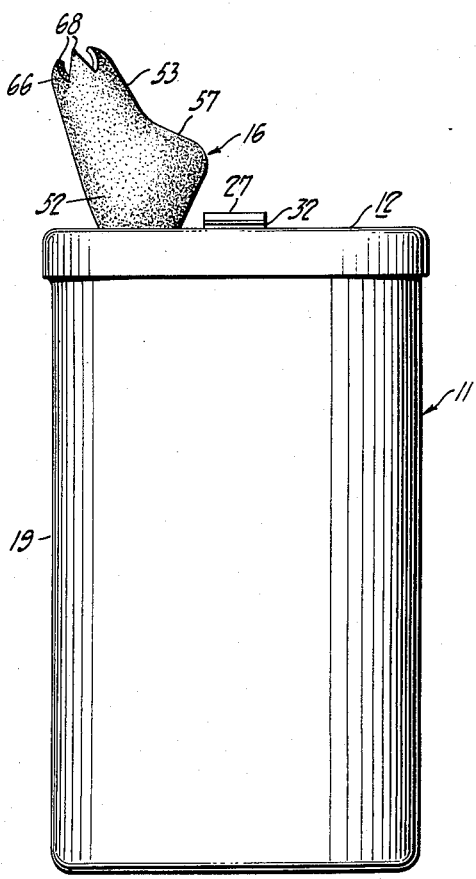
FIG_1_
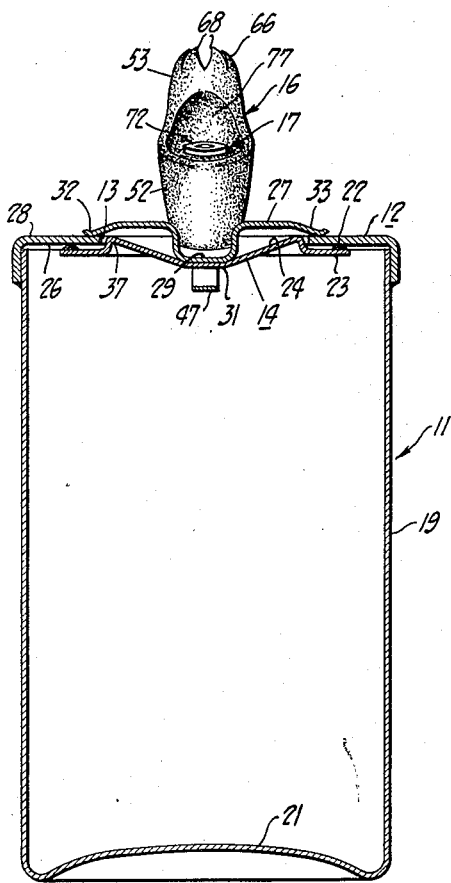
FIG_3_
INVENTORS
Frank H. Appel
Alden E. Acker
BY David F. Welch
Manfred M. Warren
their attorney Jan. 18, 1955
F. H. APPEL ET AL
2,699,890
CONTAINER AND DISPENSING MEANS
FOR A PRESSURIZED FOOD PRODUCT
Filed July 5, 1949
2 Sheets-Sheet 2
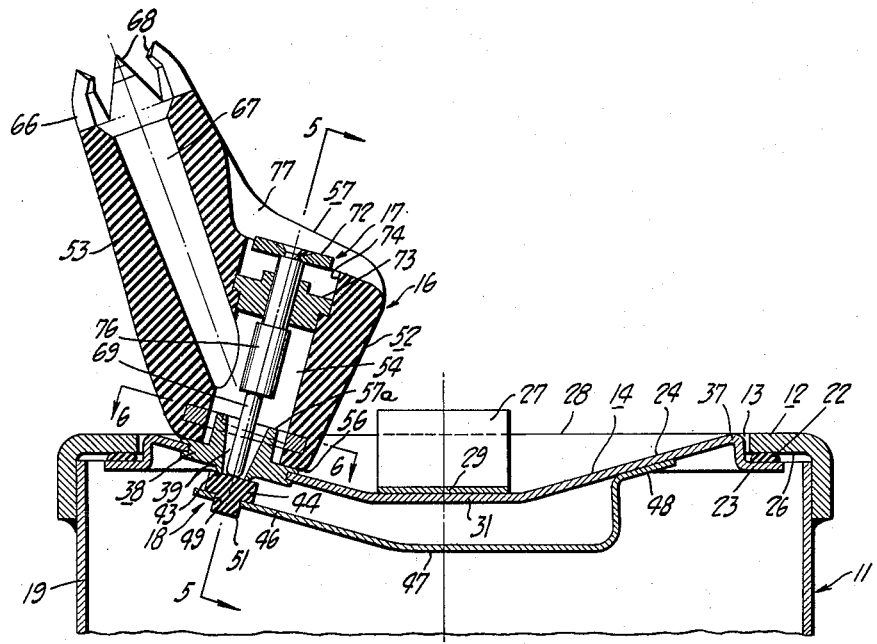
FIG_4_
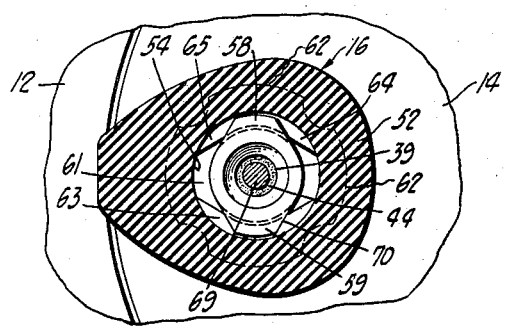
FIG_6_
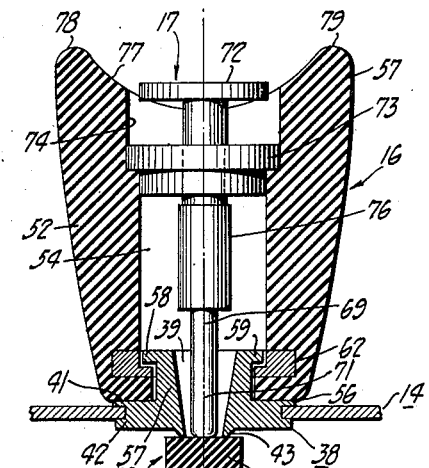
FIG_5_
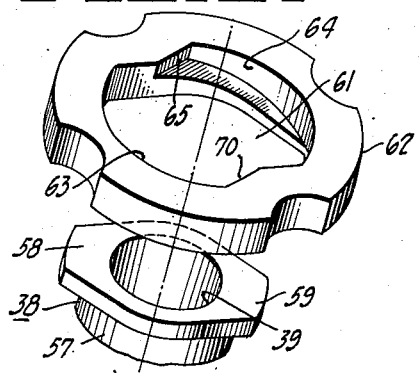
FIG_7_
INVENTORS
Frank H. Appel
Alden E. Acker
BY David F. Welch
Manfred M. Warren
their attorney

2,699,890
United States Patent Office
                    Patented Jan. 18, 1955

2,699,890

CONTAINER AND DISPENSING MEANS FOR A PRESSURIZED FOOD PRODUCT

Frank H. Appel, San Diego, and Alden E. Acker and David F. Welch, Pasadena, Calif., assignors to Pressure Containers, Inc., a corporation of California Application July 5, 1949, Serial No. 103,116

14 Claims. (Cl. 222—394)

The invention relates to a container and co-related valve and dispensing means for a pressurized food product adapted for storing and maintaining of such product under pressure and ready for use and for discharging desired and controlled quantities of the product as required in an aerated, expanded form.

An object of the present invention is to provide a container and dispensing means of the character described which is designed and constructed for completely safe processing, charging, storing, handling and dispensing of contents maintained under an elevated pressure, and in which the sealing parts are formed and arranged to improve their sealed connections with increased internal pressure, thus giving the unit an abundant factor of safety and eliminating a previous source of accidental loss of contents and injury to personnel.

Another object of the invention is to provide a container and dispensing means of the character above utilizing a minimum and substantially reduced number of parts which may be easily and rapidly dismantled and reassembled, and which are completely open and accessible for convenient and ready washing, brushing and sterilizing, and wherein the parts are further designed for adaptability to automatic machinery for processing and charging of the containers on a low cost, labor saving, mass production basis.

A further object of the invention is to provide a container and associated parts therefor as above described which are constructed in the main and with the exception of sealing parts, of solid stainless steel capable of withstanding constant use and contact with food products without appreciable wear, deterioration or contamination of the contents, and wherein the sealing parts are designed for such periodic renewal as may be required, thus providing a unit having an increased normal life and low cost of upkeep.

Still another object of the invention is to provide a container and dispensing means of the character described which will afford an improved output of the discharge product and a more complete evacuation of the contents, and wherein the product discharged will have a better and homogeneous expansion, an improved appearance, and a uniform consistency over the full range of output of the unit.

Yet another object of the present invention is to provide a new and improved form of demountable dispenser unit for a container of the character described which may be quickly and easily attached to or removed from the container by sanitary threadless connection means, and which embodies a manually displaceable actuator member normally protected against accidental displacement yet positioned and exposed for convenient engagement and operation by the index finger of the hand in which the container is held.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevation of a container and dispensing means constructed in accordance with the present invention.

Figure 2 is a plan view of the container and dispensing means illustrated in Figure 1.

Figure 3 is a cross-sectional view of the container taken on substantially the plane of line 3—3 of Figure 2.

Figure 4 is a cross-sectional view on an enlarged scale of a portion of the container and dispensing means taken at substantially right angles to the plane of the cross section of Figure 3.

Figure 5 is a fragmentary cross-sectional view taken substantially on the plane of line 5—5 of Figure 4.

Figure 6 is a fragmentary cross-sectional view taken substantially on the plane of line 6—6 of Figure 4.

Figure 7 is a perspective view of the attached parts of the container and demountable dispenser.

The container and dispensing means of the present invention is particularly designed and adapted for handling a food product placed within the container under pressure to effect upon release of the product from the container an expansion and aeration of the product. One of the important applications for the unit is for the instantaneous forming and dispensing of whipped cream. In such case, pure sweet cream of appropriate butter fat content is entered into the container, with or without other ingredients, and the container is charged with a cream-soluble gas such as nitrous oxide, to a pressure of between 100 and 200 pounds per square inch. Some of the gas goes into solution in the cream so that the equilibrium pressure is somewhat reduced from the charging pressure, being still sufficient to effect a discharge of the cream and dissolved gas upon opening of the discharge aperture. When the pressurized mix is released from the container to the relatively lower atmospheric pressure, an instantaneous expansion and release of the dissolved gas occurs, with an attendant expansion, whipping, and aeration of the cream. A variety of other food products, such as mayonnaise, egg whites, etc. may be similarly handled and dispensed in a whipped, aerated state.

The container and dispensing means of the present invention is also particularly designed for re-use, so that after evacuation of the contents the container may be returned to a processor equipped for washing, cleaning and sterilizing of the container, and re-processing the container for return to the user with a new food and gas charge. The problems encountered in the design and construction of such a unit include, among others, the requirement for absolute safety to personnel handling and using the charged units, in view of the elevated pressure used, the requirement for complete and efficient washing, cleaning and sterilizing of the unit, adaptability of the unit to automatic machinery for processing and charging on a low-cost mass-production basis, and the ability of the unit to withstand constant usage and regular processing and re-charging, at a minimum and economical charge to capital and operational costs. The present unit has been designed and constructed to meet and satisfy the requirements above and others, as more fully hereinafter explained.

With reference to the accompanying drawings, the container and dispensing means therein depicted consists, briefly, in an open-ended container 11 having an internal end or header flange 12 defining a filling opening 13, a closure lid 14 coacting with the flange 12 to seal off the opening 13, and a demountable dispenser 16 detachably secured to the unit and including manually actuated means coacting with a valve structure 18 for releasing and discharging the contents of the container. The container 11 is preferably formed of cylindrical shape, having a cylindrical side wall 19 and an integral bottom 21, the latter being desirably of concavo-convex form dished inwardly in order to resist deformation under the elevated pressures used. The side wall 19 and bottom 21 may be formed as integral parts from a single sheet by a deep draw operation, as here indicated, or otherwise fabricated. The header flange 12 is desirably secured to the upper end of the side wall 19 by a brazing or welding operation, and is here shown of somewhat heavier stock than the material used in the side wall and bottom, which by reason of their curved form may be of lighter weight for consistent strength.

As an important feature of the present unit, the closure lid 14 is adapted for mounting within the interior of the container so as to engage on its external surface the interior surface of the header flange 12 in sealing off the opening 13. In this manner, the internal pressure in the container urges the lid to a seated, sealed position, and the greater the interior pressure the greater the sealing pressure of the lid against the flange. Also preferably, the lid is dish-shaped, as illustrated in the drawings, to best resist deformation under the elevated pressure used. To effect a ready insertion of the lid into its interior position and a withdrawal of the lid for cleaning, etc., both the opening 13 and the lid are of generally oval form. In this manner, the lid may be inserted through the opening with the minor axis of the lid generally aligned with the major axis of the opening, and after insertion the lid rotated to align its major and minor axes with the corresponding major and minor axes of the opening.

To obtain an effective sealing between the lid 14 and the flange 12, an annular ring-type sealing gasket 22 is mounted upon a peripheral portion 23 of the lid on its exterior side 24, for engagement with the interior side 26 of the flange 12. The gasket may be formed of any suitable compressible sealing material, such as rubber, neoprene, or the like, and is preferably of generally oval form as shown in dotted lines in Figure 2 of the drawings and vulcanized directly onto the peripheral portion 23 of the lid for permanent attachment thereto. In order to hold the lid in attached position at the under side of the flange 12 in the absence of an internal pressure in the container, such as after evacuation of the contents, the lid is provided with a spring clip member 27 secured to the exterior side 24 and adapted to overlie and engage upon the exterior side 28 of the flange 12. As here shown, the clip member 27 is in the form of an elongated flat spring secured at a center portion 29 to a center flat 31 on the exterior side of the lid, as by spot welding, with the opposite ends 32 and 33 of the clip member extending from the center by a distance sufficient to overlie the flange 12. As will be best seen from Figure 3, the center portion 29 of the clip member is depressed so as to fit down into the hollow of the dish-shaped lid for attachment thereto as described, and the opposite ends 32 and 33 of the clip member are desirably turned up, as illustrated, for convenient deflection over the rim of the flange 12.

As another important feature of the closure construction, the opposite ends 32 and 33 of the spring member are foreshortened somewhat from the gasket 22 so as to lie in spaced relation thereto, thereby permitting full access to the gasket over its complete length for cleaning and also for removal and renewal of the gasket when required. In order to accomplish this construction and result, the flange 12, see Figure 2, is formed with opposed protuberance portions 34 and 36 which extend into the generally oval-shaped opening defined by the flange along substantially the minor axis thereof and serve as seat for supporting the opposite ends 32 and 33 of the spring clip member. Also desirably, to facilitate the ready centering of the lid with respect to the opening, the lid is provided with an annular raised shoulder 37, see Figures 3 and 4, within the peripheral portion 23 and conforming in shape to the shape of the opening but being of slightly smaller dimensions so as to fit within the opening in the plane of the flange 12 and thereby serve as an automatic centering means.

The discharge opening for the unit, valve structure 18, and the mounting means for the dispenser 16, are preferably provided in and unitarily associated with the lid 14 so that all of the operational parts of the unit are removed with the lid for convenient and easy access for cleaning, etc., and leaving, upon such removal, a perfectly open container shell which is likewise ideally adapted for washing, brushing and other cleaning. The discharge opening, valve seat, and dispenser mounting means are all provided in a simple hollow grommet-type member 38 secured to the lid 14. The hollow interior of the member provides a discharge opening 39 for the unit and the unit may be conveniently fastened in place by opposed shoulders 41 and 42 riveted or clamped to the opposite interior and exterior surfaces of the lid. If desired, the grommet member may be brazed or welded in place. At its interior side and surrounding the opening 39, the grommet is formed with a raised annular valve seat 43 for a poppet-type valve 44 carried at one end 46 of a flat elongated leaf-type spring 47, having its opposite end 48 secured to the under side of the lid remote from the grommet member. The end 48 of the leaf spring 47 may be secured to the lid, as by spot welding, and the spring is preferably offset from the lid as shown in Figure 4, so as to span the portion of the lid in spaced relation thereto between the grommet member and the point of attachment of the spring to the lid. The spring is given a pre-setting, so that the free end 46 thereof is constantly urged in the direction of the grommet member and thereby resiliently presses valve 44 into engagement with the seat 43. The valve 44 may be of any desired compressible sealing material, such as rubber, neoprene, or the like, provided with a generally flat sealing face for engagement with the annular seat 43. Convenient and ready replacement of the valve, as may be periodically required, is afforded by providing a detachable connection between the valve and the spring end 46. In the present construction, this is effected by detachably engaging a reduced shank or stem portion 49 of the valve within an aperature 51 formed in the spring end. This ready removability of the valve is also desirable for cleaning of the valve and associated parts. Since both the outer clip member 27 and the interior leaf spring 47 are desirably and most readily attached to the lid by spot welding, it is desirable that the points of attachment of these two members to the lid be separated. The best arrangement conforming to the various design and functional requirements of the unit is here accomplished by positioning the external spring clip member 27 across the lid on substantially the minor axis thereof while arranging the length of the interior leaf spring along substantially the major axis of the lid. Also, the grommet member is preferably provided near an edge of the lid on its major axis, while the secured end 48 of the leaf spring is attached to an opposite edge portion of the lid, likewise substantially on its major axis. As will be seen from Figures 3 and 4, the dish shape of the lid provides, in the inverted position of the container, an annular sump, and the positioning of the grommet member 38 near the edge of the lid, as above described, positions the discharge opening of the unit within this discharge sump, whereby improved evacuation of the contents is obtained.

The dispenser 16 is preferably formed of a cast or molded body of appropriate thermal-setting plastic material. We have found that polyethylene is desirable material for this purpose, due to its inherent toughness combined with flexibility, and its non-toxic, low moisture absorbent characteristics and stability under low as well as high temperatures, as here encountered in refrigeration and sterilization. The body is formed with a generally upright base portion 52 and an integral and offset spout portion 53 which extends upwardly and outwardly from the base portion in angular relation thereto. A bore or passageway 54 is provided through the base portion 52 between the bottom 56 of the body and the top 57 of the base portion which projects laterally from the spout portion 53 intermediate its length as an offset shoulder to the spout portion. The passageway 54 at its bottom end forms the receiving or inlet opening for the dispenser and is formed for insertion over a raised stem portion 57a on the grommet member 38. The stem 57a is formed at its upper end, see Figures 5, 6 and 7, with diametrically offset shoulders 58 and 59 which are engageable through an oval-shaped opening 61 in a metal locking ring 62, molded into the base of the dispenser body within the passageway 54. A pair of bayonet-type recesses 63 and 64 are coined into the top face of the ring and serve as sockets for receipt of and interlocking with the shoulders 58 and 59 upon threading of the base passage over the stem and rotation of the dispenser by ninety degrees, at which position shoulders 65 and 70 at the ends of the recesses 63 and 64 abut the stem shoulders 58 and 59 to stop further rotation. Preferably, the bases of the recesses 63 and 64 are inclined so as to move the dispenser longitudinally with respect to the stem 57 upon rotation of the dispenser into locked position as above described and thereby force the bottom 56 of the dispenser body into tightly fitted engagement with the top shoulder 41 on the grommet member, thus effectively sealing the bottom of the dispenser to the lid. The arrangement of the bayonet connection between the container and dispenser, as above described, is such as to position the plane of the dispenser spout 53 in substantial alignment with the plane of the major axis of the lid, as illustrated in Figures 2, 3 and 4 of the drawings. In this manner, the upper discharge end 66 of the spout portion is pointed toward the nearest peripheral portion of the container.

As another important feature of the construction, the length and angularity of the upswept spout portion 53 is such as to position the upper discharge end 66 of the spout portion in substantial alignment with the plane of the side wall of the container but with the spout end confined to a position within this plane. This relationship is best illustrated in Figures 1, 2 and 4 of the drawings. The upper end of the spout, while positioned near the plane of the side of the container for most effective discharge of the contents, is nevertheless kept within such plane and is thereby protected against contact with other objects against which the container may be positioned, and is further protected against contact and possible injury upon tipping over of the container. Discharge of the contents by the dispenser is afforded by way of a passage 67 formed in the spout portion 53 and extending from the outer end 66 thereof to the bottom 56 of the unit, where the passage 67 registers with the inlet opening at the base of passage 54, thereby providing a straight-through discharge passage from the bottom 56 of the body to the outer end 66 of the spout. Likewise, as above noted, passage 54 extends from this common inlet opening through the body to the shoulder 57. These straight-through passageways are important in permitting visual inspection of the walls of the respective passages for determination of cleanliness, and to permit straight-through brushing action in the cleaning operation.

Another important feature of the passage 67 is that it is a constantly expanding passageway from the inlet opening to its outer discharge end 66, thus enabling a continued expansion of the food product after emergence from the discharge opening 39. Also, the latter opening is preferably tapered or widened toward the upper end of the stem 57a. In this manner, the food product, after passing the valve 54, is permitted to expand throughout its passage through the dispenser, and at no point is the product forced through a restricted or reduced passage area which would tend to produce a deaerating action. To further improve the uniform consistency of the discharged product, and also its general appearance, there is provided at the outer discharge end 66 of the spout portion a plurality of finger tips 68 which are set in annular relation around the discharge passage and extend in generally parallel relation thereto but are preferably inclined somewhat into the passageway so as to comb the product being discharged therefrom. It may be noted that the flexibility of the material forming the body should be such as to permit a slightly outward deflection of the finger tips 68 in pulling out of the core or die forming the passageway 67 in the molded body.

The manual operating means 17 for the valve 44 is carried by the dispenser body and is here in the form of an elongated pin 69 mounted for reciprocation in the passageway 54 and being formed at its lower end 71 for insertion through the discharge passage 39 in the stem of the grommet member for contact at its lower end with the sealing face of the valve 44. The pin 69 also extends from the upper end of the passageway 54 and is fitted at its top end with a button or head 72 for convenient finger engagement. Means for detachably holding the pin within the bore 54 while supporting the pin for reciprocation as aforesaid, is here in the form of a collar 73 having a pressed fit within a recess 74 provided at the upper ends of the passage 54 and being centrally perforated for slidably receiving the pin. The pin may be held against separation from the collar 73 by means of enlarged shoulder 76 on an intermediate portion of the pin and the head or button 72 in the outer end of the pin. Preferably, the pin and collar are formed of metal such as stainless steel, so as to obtain similar coefficients of thermal expansion and proper sliding engagement over the wide range of temperature to which the device may be subjected. The pressed fit of the collar 73 within the recess 74 is desirably such as to permit the relatively easy withdrawal of the pin and its collar from the bore for cleaning and the simple re-insertion of the pin and collar into the bore, the fit being only sufficiently tight as to prevent accidental loss of the pin from the dispenser unit.

As an important feature of the design of the dispenser, the head or button 72 on the upper end of the pin is normally protected from accidental contact and displacement by the positioning of the head within a recess 77 formed in the top shoulder 57, it being noted, with reference to Figures 4 and 5, that the side edges 78 and 79 form spaced ridges extending well above the plane of the button. Also, the recess is desirably continued forwardly into the section of the spout portion 53 to provide a convenient receiving and guiding means for the tip of the finger used to displace the pin. Normally, the container is grasped and carried within the hand of the user with the index finger of the hand extending over the top of the container and with the tip of the index finger positioned within the recess 77 and directly upon the head 72 of the pin. The container is then inverted so that the spout portion 53 points downward toward the area onto which discharge of the product is desired, and the index finger is pressed against the pin head, displacing the pin inwardly, thereby opening the valve 44 from its seat.

After the contents of the container have been discharged, the user removes and retains the dispenser member 16 and returns the container to the processor, who effects a washing, cleaning, sterilizing and re-charging of the container for re-delivery to the user. When received by the processor, the container is dismantled by removing the lid, and all parts are appropriately cleaned and sterilized. Thereafter, the cream or other food content is entered into the container, the lid mounted in place, and the container thereby made ready for charging. In the charging machine, the head end of the container is sealed into a pressure chamber and the lid is depressed against the resilient action of the spring clip 27, thereby affording access to the interior of the container through the full opening in the head. Preferably, the air within the container is first evacuated and then a gas charge is entered. Thereafter, the lid is released for self-sealing due to the spring action of clip 27 and the internal pressure.

In former containers used for the present purposes, it has been common to employ within the container a tube extending from the bottom of the container to a discharge opening in the head end of the container. In the present unit, the requirement for this internal tube has been completely eliminated by inverting the container prior to discharge of the contents. This has several advantages, including the elimination of hard-to-clean parts, a beneficial agitation of the liquid and gas upon each inverting action, more complete elimination of contents from the container, and elimination of trapping of gas within the feeder tube. Also, it has been common to incorporate the valve within the feeder tube, thereby making full accessibility to the valve for cleaning practically impossible, and requiring the charging of the container through a very small valve aperture, with resultant slowing down of the processing. In contrast, the depressibility of the lid 14 in the present construction enables the rapid charging of the container through the full header opening. Also in clear contrast to the units heretofore available is the simplicity, openness and availability of all of the parts for cleaning. It will be noted that in the container unit there are only two moving parts, viz., the valve 44 and spring 47, and both are completely open and accessible for appropriate cleaning. An objectionable use of screw threads has been completely eliminated in all of the attachable parts, including the attachment of the dispenser to the container lid, the latter being accomplished as hereinbefore described, by broad, interengaging bayonet shoulders which are fully exposed for cleaning. Also, it will be noted that the container is designed in a manner to reduce wear to a minimum. All of the portions of the container and dispenser, with the exception of the sealing gasket 22, the valve 44 and the plastic body of the dispenser, are preferably formed of stainless steel, capable of withstanding constant use and contact with food products without appreciable wear, deterioration or contamination of the contents. Wear is confined practically exclusively to the sealing gasket 22 and the valve 44 with both of these parts may be periodically renewed in a simple and low-cost manner.

The internal pressure seal and spring action of the lid afford a greatly improved factor of safety in the use of the container and are particularly important in instances where the container may be dropped. For example, containers of the present design have been dropped under test from considerable heights onto concrete, with the impact occurring directly on the lid. In previous types of containers heretofore available, such impact would usually break the seal connection of the closure to the container and thereby sometimes cause the container to be propelled, under the action of the discharging gas, at sufficient speed to do considerable injury to personnel or property struck by the container. In the present instance, the resilient attachment of the lid to the container is capable of absorbing impact or shock occurring directly on the lid, and at most will yield for a split second to emit a thin line of the contents around the opening, the self-sealing nature of the container acting to instantaneously reseal the container. The container is also designed to permit compact storing and stacking, which is an important feature in obtaining a low-cost handling. It will be noted that the spring clip 27 extends only slightly above the plane of the top of the container, and will fit within the concavity provided by the dish-shaped bottom 21, whereby the containers may be directly stacked, one on another.

We claim:

1. A food dispensing device of the character described comprising, a container formed with an internal header flange at one end of said container defining a filling opening for pressurized fluid, a lid mounted within said container with its exterior side in juxtaposition to the interior side of said flange, sealing means mounted between said sides to seal off said opening, a hollow member extending through said lid to provide a discharge opening for said container and to provide an annular valve seat at the interior side of said lid around said last-named opening, an elongated spring secured at one end to the interior side of said lid remote from said discharge opening and positioned with its opposite end adjacent to and resiliently urged in the direction of said discharge opening, a valve carried by said second-named spring end and resiliently urged thereby into engagement with said seat, said hollow member providing at the exterior side of said lid a mounting means, and a dispensing means formed for detachable engagement with said mounting means and provided with a manually displaceable element engageable through said discharge opening for displacing said valve from said seat.

2. A food dispensing device of the character described comprising, a container formed with an internal header flange at one end of said container defining a filling opening, a dish-shaped lid mounted within said container and formed to engage on its exterior side the interior side of said flange to seal off said opening, said lid being convex on its interior side to define on inverting of said container a corner sump, said lid being formed with a discharge opening near an edge thereof and within said sump, an elongated spring secured at one end to the interior side of said lid in spaced relation to said discharge opening and arranged with the opposite end of said spring adjacent to and resiliently urged in the direction of said discharge opening, and a valve carried by said second spring end and resiliently urged thereby into sealing relation across said discharge opening.

3. A food dispensing device of the character described comprising, an open-ended container formed with an internal flange at the open end thereof, a lid mounted within said container and formed to engage on its exterior side the interior side of said flange to seal off said opening, a generally elongated spring clip secured intermediate its ends to a central portion of said lid on the exterior side thereof with the ends of said clip extending transversely to engage said flange on the exterior side thereof to hold said lid in position across said opening, said lid being formed with a discharge opening, an elongated spring member secured at one end to the interior side of said lid in spaced relation to said discharge opening and arranged with its opposite end adjacent to and resiliently urged in the direction of said discharge opening, and a valve carried by said last-named spring member end and resiliently urged thereby into sealed engagement across said discharge opening.

4. A food dispensing device of the character described comprising, an open-ended container formed with an internal flange at the open end thereof defining a substantially oval-shaped filling opening, a substantially oval-shaped lid of somewhat larger dimensions than said opening adapted for mounting within said container for engagement on its exterior side with the interior side of said flange to seal off said opening, a generally elongated spring clip member secured intermediate its ends to said lid centrally and on the exterior side thereof and extending transversely of said lid on substantially its minor axis, said lid being formed with a discharge opening near one edge thereof substantially on the major axis of said lid, an elongated leaf-type spring secured at one end thereof to the interior side of said lid adjacent an opposite edge thereof on said major axis and extending along said major axis with the opposite end of said spring adjacent to and resiliently urged in the direction of said discharge opening, and a valve carried by said last-named spring end and resiliently urged thereby into sealing relation across said discharge opening.

5. A food dispensing device of the character described comprising, an open-ended container formed with an internal flange in the open end thereof defining a substantially oval-shaped filling opening, a substantially oval-shaped lid of somewhat larger dimensions than said opening and being adapted for positioning within said container with said flange overlying a peripheral portion of said lid, said lid having a substantially oval-shaped raised shoulder substantially conforming to the size and shape of said opening and adapted to fit within said opening for centering said lid on said flange, an annular sealing gasket mounted on said lid peripheral portion for sealing said lid to said flange, a spring clip member secured intermediate its ends to said lid on the exterior side thereof and arranged with its opposite ends to overlie and seat upon said flange to secure said lid in place, a discharge opening provided in said lid, an elongated leaf-type spring secured at one end to the internal side of said lid remote from said discharge opening and having its opposite end adjacent to and urged in the direction of said discharge opening, and a valve carried by said last-named spring end and resiliently urged into sealing relation across said discharge opening.

6. A food dispensing device of the character described comprising, an open-ended container having an internal flange at the open end thereof defining a generally oval-shaped filling opening, said flange being formed with opposed protuberance portions extending into said opening along the minor axis thereof, a generally oval-shaped lid of somewhat larger dimensions than said opening and positionable within said container with said flange overlying a peripheral portion of said lid, an annular sealing gasket secured to said lid peripheral portion for engagement with said flange, a spring clip secured intermediate its ends to a central portion of said lid on the exterior side thereof and extending along the minor axis of said lid with the opposite ends of said clip spaced inwardly from said gasket and positioned to overlie said protuberance portions of said flange on the outer side thereof to secure said lid in position on said flange, said lid being formed with a discharge opening, and check valve means normally closing said opening.

7. A food dispensing device of the character described comprising, an open ended container having an internal flange at the open end thereof defining a generally oval-shaped filling opening, said flange being formed with opposed protuberance portions extending into said opening along the minor axis thereof, a generally oval-shaped lid of somewhat larger dimensions than said opening and positionable within said container with said flange overlying a peripheral portion of said lid, said lid being formed with a raised shoulder substantially conforming in size and shape to said opening and engageable within said opening for centering said lid on said flange, an annular gasket secured to said lid peripheral portion and engageable with said flange for sealing said lid across said filling opening, a spring clip member secured intermediate its ends to a central portion of said lid on the exterior side thereof and extending substantially across the minor axis of said lid with the opposite ends of said clip member spanning said shoulder but terminated short of said gasket and being positioned to overlie said protuberance portion of said flange to thereby resiliently secure said lid in position on said flange, said lid being formed with a discharge opening and check valve means normally sealing said opening.

8. A food dispensing device of the character described comprising, an open ended container having an internal flange at the open end thereof defining a generally oval-shaped filling opening, said flange being formed with opposed protuberance portions extending into said opening along the minor axis thereof, a generally oval-shaped lid of somewhat larger dimensions than said opening and positionable within said container with said flange overlying a peripheral portion of said lid, said lid being formed with a raised shoulder substantially conforming in size and shape to said opening and engageable within said opening for centering said lid on said flange, an annular gasket secured to said lid peripheral portion and engageable with said flange for sealing said lid across said filling opening, a spring clip member secured intermediate its ends to a central portion of said lid on the exterior side thereof and extending substantially across the minor axis of said lid with the opposite ends of said clip member spanning said shoulder but terminated short of said gasket and being positioned to overlie said protuberance portion of said flange to thereby resiliently secure said lid in position on said flange, said lid being formed with a discharge opening near an edge of said lid within said shoulder and on substantially the major axis of said lid, an elongated leaf-type spring having one end thereof secured to the internal side of said lid remote from said discharge opening and on substantially the major axis of said lid and extending along said major axis with the opposite end of said spring adjacent to and resiliently urged in the direction of said discharge opening, and a valve carried by said last-named spring end and resiliently urged thereby into sealing engagement across said discharge opening.

9. In a dispensing device for a container having discharge opening in the top thereof normally closed by an internally arranged check valve, a body having a generally upright base portion and an upwardly and outwardly inclined spout portion, said base portion being formed with an inlet opening at the bottom thereof connected with a passageway therethrough and being constructed for attachment to said container with said inlet opening in registration with said container discharge opening, said spout portion being formed with a passageway therethrough intersecting said first passageway at said inlet opening whereby said passageways extend in substantially straight lines completely through said body for straight-through brushing and cleaning action, and a member mounted for reciprocation in said base passageway and extending from the bottom thereof for entering said container discharge opening to actuate said valve and extending from the top of said base portion for manual engagement and displacement.

10. In a dispenser of the character described, a body having an elongated tubular spout portion providing a dispensing passage therethrough between inlet and discharge openings at the opposite ends thereof, said body being formed intermediate said spout portion ends with a laterally projecting shoulder and a second passage connecting said shoulder with said inlet opening, said shoulder being formed with a finger receiving concavity, a bearing part having a removable pressed fit in said second passage, a pin carried for reciprocation by said bearing part and extending through said second passage and from the opposite ends thereof, and a finger engaging head mounted on the end of said pin at said shoulder and formed for positioning and being positioned within said concavity.

11. In a dispensing device for a container having a hollow stem projecting therefrom for discharge of the contents of said container and being formed with a bayonet locking shoulder thereon, a moulded dispenser of thermo-setting plastic material formed with angularly related passages intersecting at a common inlet bore opening to a base side of said dispenser and being formed to slidably receive said stem, said common bore having a diameter and length permitting straight through brushing and cleaning action of said passages through said common bore, a metal ring moulded into said bore and provided with a socket formed to receive and interlock with said stem shoulder, and a pin mounted for reciprocation in one of said passages and said bore and being formed for insertion in said stem and extending from the opposite end of said last named passage for manual engagement and displacement.

12. A food dispensing device of the character described comprising, a container formed with an internal header flange at one end of said container defining a filling opening for pressurized fluid, a lid mounted within said container with its exterior side in juxtaposition to the interior side of said flange, sealing means mounted between said sides to seal off said opening, said lid being formed with a discharge opening therethrough and provided with a valve seat surrounding said discharge opening at the interior side of said lid, an elongated spring member secured at one end to the interior side of said lid remote from said discharge opening and positioned with its opposite end adjacent to and resiliently urged in the direction of said last named opening, a valve carried by said second member and resiliently urged thereby into engagement with said seat, mounting means provided on the exterior side of said lid at said discharge opening, and dispensing means detachably secured to said mounting means and provided with a manually engageable and displaceable element extending through said discharge opening for engagement with said valve for displacing said valve from said seat.

13. A food dispensing device as characterized in claim 12 wherein said last named end of said spring is provided with opening therethrough, and said valve is provided with an integrally formed shank portion of reduced diameter removably mounted in said last named opening.

14. In a dispenser of the character described, a body having a base side and formed with a generally elongated spout portion extending from said side and being formed with a first straight passageway therethrough providing an inlet opening adjacent said base side and a discharge opening at the opposite end of said portion, an integral offset portion substantially co-terminous with said spout portion at said base side and with its opposite end forming a laterally projecting shoulder extending from said spout portion intermediate the ends of said spout portion, said offset portion being formed with a second straight passageway therethrough between said ends thereof in angular relation to said spout passageway and intesecting said spout passageway at said inlet opening, said second passageway extending beyond said inlet opening and providing a common opening for said passageways at said base side and being of greater diameter than said first passageway so as to provide for straight through brushing and cleaning action of said passageways through said common opening, a pin mounted for reciprocation in said second passageway and having a length extendible at one end from said inlet opening, the opposite end of said pin extending from said shoulder for manual engagement and displacement thereat.

References Cited in the file of this patent

UNITED STATES PATENTS

| Number | Name | Date |
|---|---|---|
| 580,574 | Fowler | Apr. 13, 1897 |
| 1,195,102 | Schmidt | Aug. 15, 1916 |
| 1,734,304 | Saalbach | Nov. 5, 1929 |
| 1,837,844 | Wyzenbeek | Dec. 22, 1931 |
| 2,007,100 | Varese | July 2, 1935 |
| 2,281,604 | Smith | May 5, 1942 |
| 2,324,648 | Roeder | July 20, 1943 |
| 2,330,176 | Kahn | Sept. 21, 1943 |
| 2,360,603 | Ward | Oct. 17, 1944 |
| 2,372,392 | Pletman | Mar. 27, 1945 |
| 2,423,582 | Coleman | July 8, 1947 |
| 2,483,319 | Lueneburg | Sept. 27, 1949 |
| 2,514,030 | Coyle et al. | July 4, 1950 |
| 2,539,929 | Roberts | Jan. 30, 1951 |